Nov. 21, 1967 T. V. CRATER 3,354,267

DIFFERENTIAL PCM SYSTEM EMPLOYING DIGITAL INTEGRATION

Filed Jan. 13, 1965 2 Sheets-Sheet 1

INVENTOR
T. V. CRATER
BY Roy M. Porter Jr.
ATTORNEY

Nov. 21, 1967 T. V. CRATER 3,354,267

DIFFERENTIAL PCM SYSTEM EMPLOYING DIGITAL INTEGRATION

Filed Jan. 13, 1965 2 Sheets-Sheet 2

United States Patent Office 3,354,267
Patented Nov. 21, 1967

3,354,267
DIFFERENTIAL PCM SYSTEM EMPLOYING DIGITAL INTEGRATION

Theodore V. Crater, Hanover Township, Morris County, N.J., assignor to Bell Telephone Laboratories, Incorporated, New York, N.Y., a corporation of New York Filed Jan. 13, 1965, Ser. No. 425,275
7 Claims. (Cl. 179—15)

This invention relates to digital communication systems and, more particularly, to improvements in differential pulse code modulation systems.

The information carrying capacity of any digital communication system is used most efficiently when redundancy is eliminated. If it is possible to predict, even in part, the value of any code word before it is received, then that word fails to convey the fullest possible amount of information. In conventional pulse code modulation (PCM) systems, however, the code words are not wholly random and unpredictable. A substantial likelihood normally exists that each encoded sample amplitude will have a value which bears a definite relation to the values of preceding samples.

Predictive quantizing may be used to reduce this type of unwanted redundancy. This scheme involves predicting the value of each sample on the basis of previous samples and then transmitting the error between the prediction and the sample's actual value. Differential PCM is a special case of predictive quantizing wherein the predicted value is simply the preceding sample amplitude. The transmitted error signal is therefore made up of the encoded differences between each two successive samples of the message signal. Accordingly, a differential coder forms an encoded derivative of the input message waveform. At the receiving terminal, this differential PCM signal may be converted back into its original form by the successive operations of decoding and integration. In a preferred scheme, which is disclosed in U.S. Patent 2,605,361, which issued to C. C. Cutler on July 29, 1952, the predicted value which is employed for purposes of comparison in the encoder is not actually the immediately preceding sample amplitude but is the integral of the transmitted differential signal. Thus, each sample value is compared with that value which the receiving-end integrator should have computed for the preceding sample amplitude.

It is a principal object of the present invention to perform the decoding and integration operations required at both the transmitting and receiving ends of a differential PCM system and to perform these operations simply and with improved accuracy.

It is a further object of the present invention to translate time-division multiplexed samples from a plurality of message sources into differential PCM code words without requiring undue multiplication of equipment complexity.

In a principal aspect, the present invention takes the form of a combination decoder and integrator capable of translating differential PCM code words into the depicted analog signal. The arrangement contemplated by the invention includes a digital memory for storing a limited series of prior differential code words. When read out of the memory, these words are weighted, the more recent words being multiplied by a larger factor, and the resulting weighted values are combined to produce the desired decoded and integrated signal. According to a feature of the present invention, a memory of somewhat greater capacity may be employed to permit the differential encoding of time-division multiplexed samples from a plurality of message sources. In a preferred embodiment of the invention, a novel memory unit subcombination may be advantageously employed to store and time-compress code words in order to simplify the summing and weighting process.

These and other objects, features and advantages of the present invention may be more fully understood by considering the following detailed description. In the written text of this description, reference will be made to the attached drawings in which.

*Background*

Figure 1:
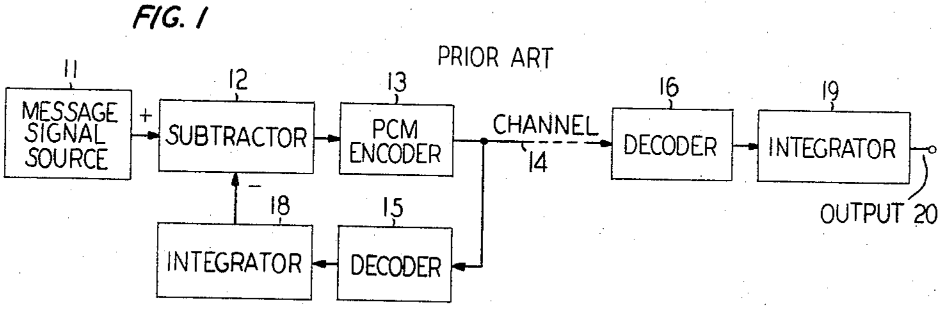
FIG. 1 illustrates a differential PCM system of a basic type known to the art.

In the illustrative prior art differential PCM system shown in block diagram form in FIG. 1 of the drawings, an analog message signal from the source 11 is applied to one input of the subtractor 12. The output of subtractor 12 is connected directly to the input of a conventional PCM encoder 13. The differential PCM code words, developed by the encoder 13, are applied both to the transmission channel 14 and to the input of a decoder 15. Having traversed the channel 14, these same digits are applied to the input of a receiving end decoder 16. The analog output signal from decoder 15 is passed through an integrator 18 to the second input of subtractor 12. At the receiving terminal, the decoded signal from decoder 16 is likewise integrated by integrator 19 and the resulting signal, a replica of the original waveform from source 11, appears at output terminal 20.

As discussed earlier, the digits from encoder 13 of FIG. 1 approximate an encoded derivative of the input waveform from source 11. Accordingly, the successive operations of decoding and integrating, whether performed by the receiving-end equipment or by like devices in the feedback loop of the differential encoder, produces a replica of the original waveform. Noting in FIG. 1 that the signal from subtractor 12 is first coded by encoder 13 and then immediately decoded by decoder 15 before being passed to the input of integrator 18, one might be led to ask why a connection is not made directly between the output of subtractor 12 and the input of integrator 18, thus eliminating the need for decoder 15. The answer resides in the fact that, in the circuit as shown in FIG. 1, the signal applied to the input of integrator 18 is "quantized" by the successive coding and decoding operations. As disclosed in the aforementioned Cutler Patent 2,605,361, the inclusion of quantization within the feedback loop has the effect of lowering the distortion contributed by the differential encoding process.

The present invention contemplates an improved decoder-integrator combination and, in this regard, it should be noted that this unit is required both at the transmitting and receiving ends of the typical differential PCM system. Absent an error in transmission over channel 14, it may be readily noted that the output signal appearing at terminal 20 will be identical to the output signal from integrator 18. The "predicted value" which is subtracted from the message signal sample is therefore equivalent to the amplitude level which the receiving-end equipment should have computed for the preceding sample amplitude.

In prior differential PCM systems, integration has been accomplished on an analog basis by circuits of the type used in analog computers. While these devices are capable of performing the integration operation with accuracy, they are unable to handle more than one waveshape at a time. Where it is necessary to decode and integrate a time-division multiplexed differential PCM signal, a plurality of integrators are required. As will be discussed in the detailed description to follow, the present invention is adapted to translate time-division multiplexed code words into time-division multiplexed analog samples without undue multiplication of circuit complexity.

In an idealized system, the instantaneous value of the integrated signal appearing at terminal 20 would be dependent upon the entire past history of the encoded differential signal passing over channel 14. In practical schemes, however, the cumulative nature of transmission errors cannot be ignored. With lossless integration, a transmission error would cause the signals appearing at the outputs of integrators 18 and 19 to differ at all times thereafter by a fixed value. Said another way, an error in transmission would create D.C. component which would be added to the correct waveform. This undesired error component may be allowed to leak away so that the signal appearing at terminal 20 converges to the correct value. If this leak is introduced at the receiving-end integrator alone, any D.C. component which is actually in the message signal will be allowed to leak away as well. This effect may be eliminated by introducing leak into the integrator 18, thereby creating a compensating D.C. component in the transmitted differential signal. While increasing the leak rate allows transmission error components to decay more rapidly, the predicted value generated by the integrator 18 becomes an increasingly poor approximation of the value of the previous sample amplitude. The value of leak actually used in a given differential PCM system is dictated by a variety of considerations; principally, the error rate of the transmission facility and the permissible subjective degradation caused by the D.C. components created by these errors.

Implicit from the integrator leak is the deduction that all past samples need not be "remembered" by the integrator. As a differential code word becomes more remote in time, it loses its significance. It is, therefore, permissible to base a prediction of a sample amplitude upon a limited series of the more recent differential code words. As contemplated by the present invention, this limited series of code words may be stored in a digital memory in order to permit the processing of time-division multiplexed signals.

*Detailed description*

Figure 2:
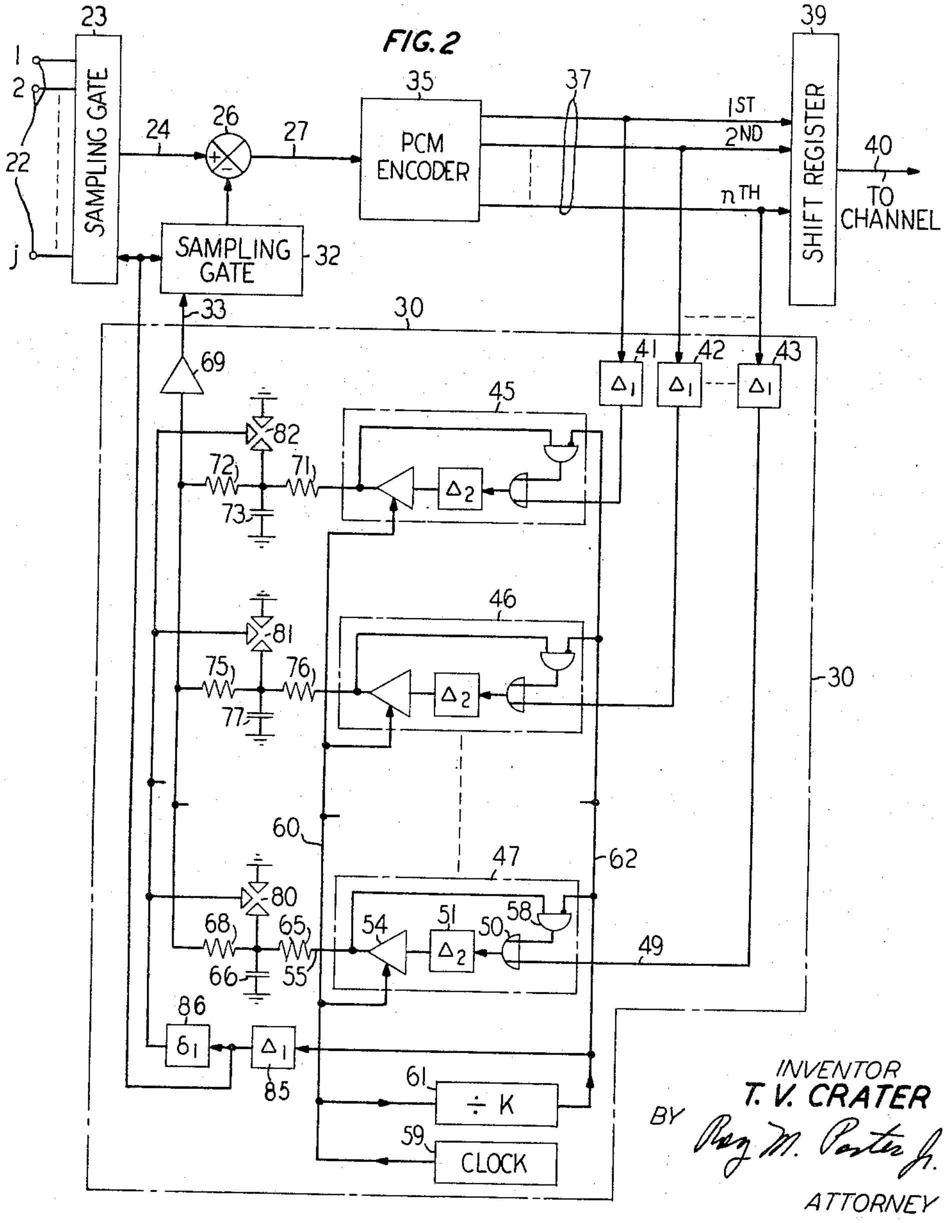
FIG. 2 depicts in detail an illustrative differential PCM encoder which embodies the principles of the present invention.

A more detailed drawing of a differential PCM encoder appears in FIG. 2. This encoder includes a decoder-integrator embodying the invention within its negative feedback loop. The encoder of FIG. 2 is adapted to translate *j* message signals into time-division multiplexed differential PCM code words each of which comprises *n* digits. The *j* different analog message signals are applied to respective ones of the *j* inputs 22 of sampling gate 23. The signal appearing on conductor 24 is accordingly made up of a series of pulses of varying amplitudes representing the interleaved samples of the *j* input signals. The multiplexed sample pulses from gate 23 are applied to one input of a subtractor 26.

As will be shown, a decoder-integrator unit 30 develops a "predicted value" signal which is applied to a second sampling gate 32 by way of conductor 33. The resulting sample pulses developed by gate 32 are applied to the second input of the subtractor 26. The different signal sample pulses from subtractor 26 are applied to the input of a conventional PCM encoder 35. Encoder 35 is provided with *n* output conductors 37, each of which carries one of the *n* digits of the differential PCM code word which is generated in parallel form by the encoder 35. These *n* digits are converted into serial form by a shift register 39 for transmission over a channel 40.

Each *n* digit differential code word generated by the encoder 35 is fed to the decoder-integrator 30, the first and most significant digit being applied to a delay unit 41, the second digit to a delay unit 42, and the *n*th and least significant digit to a delay unit 43. Pulses from the delay units 41, 42, and 43 are then passed to memory units 45, 46, and 47, respectively. These units are essentially identical and only unit 47, which handles the least significant digit will be described in detail.

Input pulses from the delay unit 43 travel along conductor 49 to one input of an OR gate 50. The output of the OR gate 50 is connected to the input of a delay unit 51 by conductor 53. Pulses emerging from delay unit 51 are reshaped by regenerators 54 and appear on the memory unit output conductor 55. The regenerated pulses are fed back to the input by means of an INHIBIT gate 58. The conductor 55 is connected to one input to gate 58 and the output of gate 58 is connected to the other input to OR gate 50. Timing signals from a clock 59 are applied to the regenerator 54 in memory unit 47 as well as to the regenerators in units 45 and 46 by way of conductor 60. The timing signals on conductor 60 are also applied to the input of a counter circuit 61 which delivers an output pulse to the conductor 62 for every *k*th timing impulse from clock 59. K is the number of past differential code words which are to be used to form the predicted value samples appearing on the conductor 33. Conductor 62 is connected to the inhibit input of INHIBIT gate 58 as well as to the inhibit gates in memory units 45 and 46. As will be explained in more detail in conjunction with the illustrative waveforms shown in FIGS. 2A–2D of the drawings, the memory units serve to store and group pulses to allow simplified integration.

The output of each memory unit 45 through 47 is connected to an integrating circuit. A resistance 65 and an accumulating capacitor 66 are connected in series between the output conductor 55 and ground. A summing resistance 68 connects the junction of resistance 65 and capacitor 66 to the input of a summing amplifier 69. A congruent network comprising resistances 71 and 72 and capacitor 73 is connected between the output of memory unit 45 and the input of summing amplifier 69. Likewise, resistances 75 and 76 with capacitor 77 form a similar network which is connected between the input to amplifier 69 and the memory unit 46. An electronically operated switch 80 is connected in parallel with the capacitor 66 while similar switches 81 and 82 are connected in parallel with the capacitors 77 and 73, respectively. These switches are normally open but are closed to discharge the connected capacitors upon receipt of an impulse which travels through the delay units 85 and 86 from the output of counter circuit 61. A connection is also made from the output of delay unit 85 directly to the sampling gates 23 and 32 for synchronization purposes. The delay unit 86 induces a short time delay between sampling and the closure of the switches 80, 81, and 82.

Figures 2A, 2B, 2C, 2D, 3:
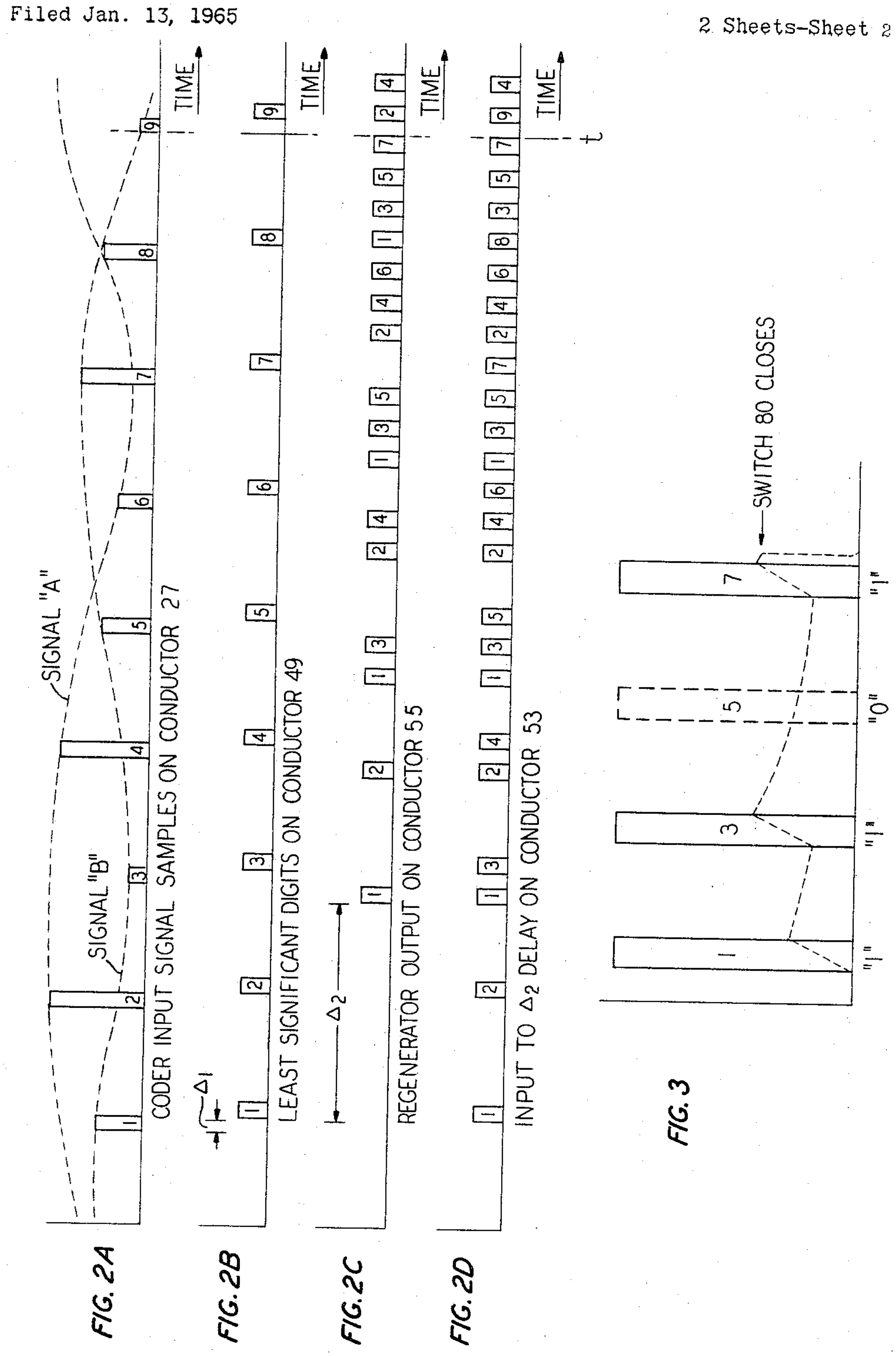
FIGS. 2A–2D show a group of waveforms which illustrate the operation of the circuit of FIG. 2.
FIG. 3 shows a waveform which depicts the operation of the integrator of FIG. 2.

A clearer understanding of the operation of the embodiment of the invention shown in FIG. 2 of the drawings may be obtained by considering the waveforms shown in FIGS. 2A through 2D. FIG. 2A shows the sample pulse input to the encoder 35. In order to simplify the description, two multiplexed differential signals, "A" and "B," have been shown. These two sample signals which appear on conductor 27 are interlaced, the even-numbered samples being representative of an analog differential signal "A" while the odd-numbered samples depict a different analog signal "B." Each of these samples is then encoded into an *n* digit code word appearing on conductors 37 to form time-division multiplexed code words. As is well known, the samples of a given signal are taken at at least the Nyquist rate; that is, at a rate at least equal to twice the highest frequency component contained by signal being sampled.

FIG. 2B shows the waveform appearing on conductor 49. In order to permit tracing of the pulses, an unusual case is shown wherein all of the nine samples shown in FIG. 2A, when encoded, happened to result in code words all of which have a least significant digit which is a "1." This results in a series of nine ON pulses on conductor 49. For example, the pulse labeled "6" in FIG.

2B is the least significant digit of the code word representing the amplitude of the sixth sample shown in FIG. 2A. It may also be noted that each pulse which occurs on conductor 49 is delayed by the amount $\Delta_1$ from the associated sample pulse due to the delay unit 43.

The operation of the memory unit 47 may be understood by following pulse number 1 in its path through the circuit. This pulse enters on conductor 49, passes through the OR gate 50 and is delayed by an amount $\Delta_2$ before being reshaped by regenerator 54 and applied output conductor 55 as shown in FIG. 2C. The delay time $\Delta_2$ is of a duration appropriate for causing pulse number 1 to re-enter the delay unit 51 just before pulse number 3 first appears on conductor 49. Thereafter, the pulse pair 1 and 3 re-enter the delay unit 51 just before the appearance of pulse number 5, and so on. As can be appreciated, the odd and even-numbered pulses are separated into recurrent groups in which the pulses are bunched together more closely in time than they were prior to entering the unit. The conductor 62 which is connected to the inhibit input of gate 58 is energized each time a pulse appears on conductor 49 so that pulses circulating around the delay loop are removed to make room in the store for newly arriving pulses. For example, a comparison of FIGS. 2B and 2C shows that pulse number 1 is in position to re-enter the delay unit 51 when pulse number 8 appears for the first time on conductor 49. Pulse number 1 is at that time inhibited by gate 58 from interfering with pulse number 8.

By comparing FIGS. 2A and 2C, it may be seen that at time $t$ the leading edge of the ninth sample pulse exists contemporaneously with the trailing edge of the seventh digit pulse at the regenerator output on conductor 55. It may also be noted from FIG. 2C that the odd-numbered pulses 1, 3, 5, and 7 associated with signal "B" are grouped together and applied in succession to the capacitor 66 through resistance 65 just prior to the time $t$.

FIG. 3 of the drawings shows the waveform involved in the integration process in more detail. In FIG. 3, $k$ (the number of stored digits) equals four. The regenerator 54 of FIG. 2 develops essentially rectangular pulses whenever the output digit is a "1." Each ON pulse causes capacitor 66 to be charged through resistance 65. During the spaces between pulses and when an OFF pulse is present, the conductor 55 is at zero potential and the charge accumulated on capacitor 66 leaks away through resistance 65. Without this leak, the prior pulses would be accumulated to produce an ideal integral.

As may be readily appreciated from FIG. 3 of the drawings, the $k$ pulses from the memory unit are weighted in accordance with their time position with respect to the incoming message signal sample. Digits of code words which represent more recent differential samples are weighted more heavily because the leak in the integrating circuit reduces the effective amplitude of the earlier digits. At the end of the last pulse in the series of $k$ stored pulses, the voltage existing across the capacitor 66 represents a "lossy" integration of the series of least significant digits. This voltage, along with the voltages from the other integrating networks, is applied to the summing amplifier 69 through a summing resistance 68. The integration of the most significant digits which appear across capacitor 73 is attenuated by the summing resistance 72. As the significance of the associated integration decreases, the value of each of the summing resistances increases. Thus, if resistance 72 has the value R, resistance 75 has the value 2R, and so on, the last resistance 68 associated with the least significant digit having the value $2n$R. In this manner, the input current to the amplifier 69 from each integrating capacitor is weighted in accordance with the significance of the voltage across that capacitor. Sampling gate 32 accordingly delivers predicted value samples to the subtractor 26.

The embodiment of the invention shown in FIG. 2 of the drawings may be modified to handle a selected number of input message signals $j$, differential code words composed of a selected number of digits $n$, and where $k$ past samples are stored to form the predicted value samples. If T is the period between two samples of the same message signal as taken by the sampling gate 23, then the delay unit 51 and like delay units should be adjusted such that $$\Delta_2=T\left(1-\frac{1}{kj}\right)$$

The delay units 41, 42, and 43 should delay the digits from the encoder 35 by period which, when combined with the residual delays in the remainder of the feedback loop (exclusive of $\Delta_2$) should equal $T/2kj$.

It is to be understood that the embodiment described above is merely illustrative of an application of the principles of the invention. Numerous modifications may be made by those skilled in the art without departing from the true spirit and scope of the invention.

What is claimed is:

1. In combination, a source of a series of differential PCM code words, a digital memory connected to said source for storing said words, read-out means connected to said memory for delivering $k$ consecutive words from said memory each time a new word in said series is received from said source, and accumulating means for forming the weighted sum of said $k$ words to produce an analog signal sample.

2. Apparatus as set forth in claim 1 wherein said accumulating means for forming the weighted sum of said $k$ words includes means for weighting said $k$ words in accordance with their original time position in said series, the earlier of said $k$ words being accorded less significance than the more recent of said $k$ words.

3. In combination, a source of a series of time-division multiplexed differential PCM code words representative of a plurality of analog signals, a digital memory for storing said series of words, means for reading a set of $k$ words from said memory each time a new word in said series is received from said source, all of the words in said set of $k$ words being representative of a single one of said plurality of analog signals, and accumulating means for forming the weighted sum of said $k$ words to produce an analog signal amplitude.

4. In combination, a source of a series of $n$ digit differential PCM code words, said source having $n$ parallel output conductors each for carrying one digit of each of said words, $n$ delay units each having an input terminal and an output terminal and each exhibiting a delay time having a duration less than the time duration separating said words in said series, means for connecting each of said $n$ output conductors from said source to the input terminal of one of said delay units, a feedback path connected around each of said delay units for re-applying those digits which appear at the output terminal of a given delay line to the input terminal of said delay line, and accumulating means connected to the output terminal of each of said $n$ delay units for forming the weighted sum of those digits which appear at the output terminals of said delay units.

5. In combination, a source of a series of $n$-digit differential PCM code words, said source having $n$ parallel output conductors each for carrying one digit of each of said words, $n$ delay units each having an input terminal and an output terminal and each exhibiting a delay time having a duration less than the time duration separating said words, means for connecting each of said $n$ output conductors to the input terminal of one of said delay units, a feedback path connected around each of said delay units for re-applying those digits which appear at the output terminal of a given one of said delay lines to the input terminal of said given delay line, $n$ integrating capacitors, circuit means for connecting the output terminal of each of said delay units to a respective one of said integrating capacitors such that said capacitors are charged in response to the digit signals appearing on the output terminals of said delay units, and means for forming a weighted sum of the voltages across each of said $n$ integrating capacitors to produce an analog voltage sample.

6. In combination, a source of a series of time-division $n$-digit differential PCM code words, said series being representative of $j$ different analog signals, said source having $n$ parallel output conductors each for carrying one digit of each of said words, $n$ delay units each having an input terminal and an output terminal and each exhibiting a delay time $\Delta_2$ where $\Delta_2$ is less than the time period separating two consecutive words in said series which are representative of the same analog signal, means for connecing each of said $n$ output conductors to the time input terminal of one of said delay units, a feedback path connected around each of said delay units for reapplying those digits which appear at the output terminal of a given delay line to the input terminal of said delay line, and accumulating means connecting to the output terminal of each of said $n$ delay units for summing groups of $k$ consecutive digits appearing at the output terminal of each of said delay units.

7. Apparatus as set forth in claim 6, wherein $\Delta_2$ is approximately equal to the quantity $$\left(1-\frac{1}{kj}\right)$$

times the said time period separating two consecutive words in said series which are representative of the same analog signal.

References Cited

UNITED STATES PATENTS

| | | | |
|---|---|---|---|
| 2,784,256 | 3/1957 | Cherry | 333—19 X |
| 3,065,304 | 11/1962 | Dawson | 179—15 |
| 3,091,664 | 5/1963 | Tyrlick | 179—15 |

JOHN W. CALDWELL, *Primary Examiner.*

J. T. STRATMAN, *Assistant Examiner.*